United States Patent

[11] 3,628,910

[72] Inventor Martin Grayson
 Norwalk, Conn.
[21] Appl. No. 546,554
[22] Filed May 2, 1966
[45] Patented Dec. 21, 1971
[73] Assignee American Cyanamid Company
 Stamford, Conn.

[54] COMPOSITIONS FOR THE DEFORMATION OF KERATIN
 5 Claims, No Drawings
[52] U.S. Cl. .................................................... 8/127.51,
 8/94.16, 8/161, 424/71
[51] Int. Cl. .................................................... A61k 7/10
[50] Field of Search.......................................... 260/606.5
 P; 167/87.1, 89; 8/128, 127.5, 127.6, 127.51

[56] References Cited
UNITED STATES PATENTS

| 3,251,883 | 5/1966 | Rauhut et al. ................ | 260/606.5 |
| 3,256,154 | 6/1966 | Jenkins et al. ................ | 167/87.1 |

FOREIGN PATENTS

| 138,932 | 7/1960 | U.S.S.R. ...................... | 260/606.5 |
| 138,618 | 9/1960 | U.S.S.R. ...................... | 260/606.5 |

OTHER REFERENCES

Chemical Abstracts 55:9317, (1961)

*Primary Examiner*—Jerome D. Goldberg
*Attorney*—Patrick C. Baker

ABSTRACT: A method for deforming keratin is provided which comprises applying such compositions to keratin.

COMPOSITIONS FOR THE DEFORMATION OF KERATIN

Generally stated, the subject matter of the present invention relates to a composition for the deformation of keratin. More particularly, the invention relates to a composition comprising an organic phosphine which is employed in either altering the configuration of keratin fibers, or the depilation of same. Furthermore, the invention relates to a method of deforming keratin which comprises the application of an organic phosphine to keratin fibers.

Human hair is composed almost entirely of keratin, a protein which is also the major constituent of horn and feathers and other mammalian hair, particularly wool. Keratin, to which hair largely owes its characteristic physical properties, is particularly rich in the sulfur-containing amino acid, cystine. Cystine, in turn, is linked chemically with other nonsulfur amino acids, including aspartic and glutamic acids. The disposition of the sulfur in the keratin fiber becomes such as to form a sulfur-to-sulfur bridge between polypeptide chains, indicated as R in the following general formula:

$$R-CH_2-S-S-CH_2R$$

The kind and arrangement of these amino acid residues in juxtaposition to cystine seems to govern the degree of protection or the vulnerability of the disulfide linkages to attack by chemical agents, since all disulfide linkages in keratin are not equally reactive.

Most of the chemical treatment of keratin involves the rupture and reformation of the disulfide linkages which, under normal conditions confer stability and flexibility to the keratin fiber. Depending on the ultimate objective, the disulfide linkage may be indiscriminately cleaved as in depilation, so that the keratin fiber will readily disintegrate. But when merely altering the configuration of keratin fibers is the objective, it is most important to prevent complete breakdown of all cross-linking disulfide bonds.

Depilation employs different chemical agents such as alkalies, metal sulfides and sulfites, amines, mercaptans, and certain metal salts. In the depilation process an increasing osmotic pressure develops within the keratin fiber which swells, loses its tensile strength and generally deteriorates. Both the outer layer, the cuticle, and the inner color-bearing layer, the cortex, are disintegrated.

In comparison with depilation, the alteration of configuration of keratin fiber is accomplished while the keratin fiber is maintained in either a straightened or curled position. In essence, the polypeptide chains are rearranged as a consequence to a rupture of the disulfide bonds of keratin, forming sulfhydryl groups. The rearrangement is then made permanent by neutralization, or hardening of the keratin fiber. The most satisfactory method of neutralization or hardening is an oxidation process which substantially restores the keratin fiber to its original condition by reformation of the disulfide linkages.

In the past, compositions for altering the configuration of keratin fibers, or the depilation of same, have generally contained mercaptans. In particular, thioglycolic acid and its salts constituted the primary ingredient. Thioglycolic acid in addition to being costly is irritating to the skin, as well as being particularly noxious. Moreover, thioglycolic acid and its salts tend to decompose during use.

The present invention represents the culmination of a long series of investigations conducted largely by the inventor and his associates in attempts to achieve the deformation of keratin without the attendant disadvantages inherent in the use of mercaptans. The inventive concept resides in the discovery that particular organic phosphines are capable of achieving the aforementioned objective.

Therefore, the invention relates to a composition of matter for the deformation of keratin, which comprises in a concentration of at least 0.01 moles of a member selected from the group consisting of bis(hydroxymethyl)methylphosphine, (hydroxymethyl)dimethylphosphine, diethyl(2-hydroxyethyl)phosphine, dicyclohexyl(2-hydroxyethyl)phosphine, (hydroxymethyl)dipropylphosphine, bis(hydroxymethyl)propylphosphine, ethylbis(hydroxymethyl)phosphine, diethyl(hydroxymethyl)phosphine, bis(3-hydroxypropyl)phosphine, butylbis(hydroxymethyl)phosphine, hexylbis(hydroxymethyl)phosphine, (hydroxymethyl)diisobutylphosphine, octylbis(hydroxymethyl)phosphine, bis(hydroxymethyl)isobutylphosphine, and mixtures thereof in an acceptable vehicle.

In addition, the invention relates to a method of deforming keratin comprising in a concentration of the application to keratin fibers of a composition which comprises at least 0.01 moles of a member selected from the group consisting of bis(hydroxymethyl)methylphosphine, (hydroxymethyl)dimethylphosphine, diethyl(2-hydroxyethyl)phosphine, dicyclohexyl(2-hydroxyethyl)phosphine, (hydroxymethyl)dipropylphosphine, bis(hydroxymethyl)propylphosphine, ethylbis(hydroxymethyl)phosphine, diethyl(hydroxymethyl)phosphine, bis(3-hydroxypropyl)phosphine, butylbis(hydroxymethyl)phosphine, hexylbis(hydroxymethyl)phosphine, (hydroxymethyl)diisobutylphosphine, octylbis(hydroxymethyl)phosphine, bis(hydroxymethyl)isobutylphosphine, and mixtures thereof in an acceptable vehicle.

The aforementioned organic phosphines may be produced in aqueous or aqueous-alcoholic solutions from their precursor organic phosphonium salts by an equilibrium process, as for example, $$CH_3PH(CH_2OH)_2Cl \rightleftharpoons CH_3P(CH_2OH)_2 + HCl$$

the reaction may be controlled with regard to the concentration of organic phosphine by the adjustment of pH, temperature and concentration. The adjustment of pH is achieved by the utilization of alkaline agents such as alkali or alkaline earth carbonates, hydroxides or amines and quaternary ammonium hydroxides among others. With regard to those equilibrium processes which result in the formation of formaldehyde, as for example, $$CH_3P(CH_2OH)_3Cl \rightleftharpoons CH_3P(CH_2OH)_2 + CH_2O + HCl$$

the reaction may also be controlled by the addition of aldehyde removing agents such as bisulfites.

The novel compositions of the present invention, containing the aforementioned organic phosphines or their precursor phosphonium salts, may be used at pH values from 2-14, preferably from 8-12. The pH value of the composition is directly related to the ultimate end use of the composition, as for example, a composition which is to be employed as a depilatory will have a pH of from about 12 to 13, whereas a composition for altering the configuration of keratin fibers will have a pH of from about 8 to 10. Temperatures from 15° to 100° C. may be employed, although preferred operation will be at or near ambient temperatures.

The organic phosphines employed in the novel compositions of the present invention may be prepared in situ from their corresponding precursor phosphonium salts by the addition of an alkaline substance to a solution of the particular phosphonium salt.

With regard to the concentration of organic phosphine present in the novel composition of the present invention, 0.01 moles of represents that concentration at which deformation of keratin fibers is achieved, and the concentration is so stated since said compounds are effective as keratin deformers in a pure state, that is 100 percent. The use of said compounds in their pure state is for the most part impractical, as a consequence to the factors of solubility, as well as efficiency in achieving the desired result. Efficient deformation of keratin bears a direct relationship to concentration, since an increase in concentration results in a decrease in the time necessary to effectively deform keratin. However, a point is reached at which an increase in concentration will not appreciably affect the factor of time, as for example, a 2 molar concentration will achieve effective deformation of keratin in approximately 30 minutes, whereas, the use of the pure compound will at best effect a 30 percent decrease in time. The result clearly does not warrant the added cost, as well as the disadvantages inherent in the use of such high concentrations.

Since the aforementioned organic phosphines are readily oxidized, it is preferred to formulate the novel keratin deforming composition of the present invention with an inert propellent under pressure to be dispersed as an aerosol foam, cream, or the like. However, this does not preclude the formulation of the novel composition of the present invention as a conventional cream, paste, or liquid, so long as airtight containers are used. In addition, the novel composition of the present invention may also include an antioxidant to stabilize the composition such as hydroquinone, the monoethylether of hydroquinone, 2,2′ditertiaryburyl-4-methylene-6,6′-dimethyl bisphenol, sulfites and bisulfites among others. Furthermore, surface active agents, and swelling agents such as ammonia or urea, as well as other keratin deforming agents such as bisulfite salts, thioglycolate salts and borohydride salts may be incorporated in the composition. Additionally, the composition may contain perfumes, thickening agents opacifiers and other cosmetically desirable additives. The ultimate criteria of incorporation being dependent on the compatibility of said agents with the organic phosphines.

When the novel composition of the instant invention is to be used in altering the configuration of keratin fibers, the conventional neutralization or hardening of keratin fiber by oxidation may be employed. This may be effected by the utilization of organic or inorganic peroxides, bromates, persulfates and the like, or by prolonged exposure to air alone or in the presence of catalytic agents which will promote the oxidation of sulfhydryl groups.

Illustrative of the vehicles which may be employed in the present invention, in addition to water, are polyhydric alcohols, ethanol, isopropanol and the monoethyl ether of ethylene glycol among others. The above may be used alone or in combination with water. Furthermore the vehicle may be a cosmetically acceptable cream base or the like.

EXAMPLE I

A NOVEL COMPOSITION FOR ALTERING THE CONFIGURATION OF KERATIN FIBERS

This example demonstrates a novel composition for altering the configuration of keratin fibers, which employs the inventive concept of the present invention.

The following composition was prepared:

| Butylbis(hydrta | Percent by Weight |
|---|---|
| Butylbis(hydroxymethyl phosphine | 8 |
| Polyoxyethylene 10 cetyl ether | 3.5 |
| Stearyl alcohol ethylene oxide | 4 |
| Water | up to 100 |

The polyoxyethylene 10 cetyl ether and the stearyl alcohol ethylene oxide were added to 50 parts of water with stirring on a steam bath. The mixture was then cooled to room temperature, placed under a nitrogen blanket and the butylbis(hydroxymethyl)phosphine was added. The balance of water was added, and the pH was adjusted to 9 by the addition of ammonium hydroxide.

Laboratory tresses made of natural, untreated human hair were mechanically wound on curlers. The hair was saturated with the above composition and allowed to stand for 30 minutes; after which time the tresses were thoroughly water rinsed. The tresses were then neutralized with a 10 percent aqueous solution of sodium bromate, and rinsed again. The tresses were dried and styled into conventional curls. A satisfactory wave was obtained.

EXAMPLE II

A NOVEL COMPOSITION FOR DEPILITATING KERATIN FIBERS

This example demonstrates a novel composition for the depilating of keratin fibers which employs the inventive concept of the present invention. The following composition was prepared:

| | Percent by Weight |
|---|---|
| Bis(hydroxymethyl)methyl-phosphine | 10 |
| Polyoxyethylene 10 cetyl ether | 10 |
| Stearyl alcohol ethylene oxide | 10 |
| Water | up to 100 |

The polyoxyethylene 10 cetyl ether and the stearyl alcohol ethylene oxide were added to 50 parts of water with stirring on a steam bath. The mixture was then cooled to room temperature, placed under a nitrogen blanket and the bis(hydroxymethyl)methylphosphine was added. The balance of water was added, and the pH was adjusted to 12.5 by the addition of sodium hydroxide.

Laboratory tresses made of natural, untreated human hair were attached to a laboratory test peg board, and saturated with the above composition for approximately 15 minutes. The tresses were then wiped with a clean cloth and disintegrated on touch, thereby achieving a satisfactory depilatory effect.

EXAMPLE III

This example demonstrates the keratin deforming nature of other organic phosphines.

Compositions employing the inventive concept of the present invention were prepared in the manner set forth in example I, substituting for butylbis(hydroxymethyl)phosphine in different compositions bis(hydroxymethyl)propylene, ethylbis(hydroxymethyl)phosphine, hexylbis(hydroxymethyl)phosphine, and bis(hydroxymethyl)isobutylphosphine. The compositions in each of the above enumerated substitutions exhibited the same efficacy, with regard to keratin deformation, as demonstrated in example I.

What is claimed is:

1. A method for deforming keratinic fibers which comprises applying to said keratinic fibers an effective amount of a composition consisting of at least 0.01 moles of a member selected from the group consisting of bis(hydroxymethyl)-methylphosphine, (hydroxymethyl) dimethylphosphine, diethy (2-hydroxyethyl) phosphine, dicyclohexyl (2-hydroxyethyl) phosphine, (hydroxymethyl) dipropylphosphine, bis-(hydroxymethyl) propylphosphine, ethylbis (hydroxymethyl)-phosphine, diethyl (hydroxymethyl)phosphine, bis (3-hydroxypropyl) phosphine, butylbis (hydroxymethyl) phosphine, hexylbis (hydroxymethyl)phosphine, (hydroxymethyl) diisobutylphosphine, octylbis (hydroxymethyl) phosphine, bis-(hydroxymethyl) isobutylphosphine, and mixtures thereof in an acceptable vehicle at a pH of 2 to 14.

2. A method according to claim 1 wherein the organic phosphine is bis(hydroxymethyl)propylphosphine.

3. A method according to claim 1 wherein the organic phosphine is ethylbis(hydroxymethyl)phosphine.

4. A method according to claim 1 wherein the organic phosphine is hexylbis(hydroxymethyl)phosphine.

5. A method according to claim 1 wherein the organic phosphine is bis(hydroxymethyl)isobutylphosphine.

* * * * *

UNITED STATES PATENT OFFICE
CERTIFICATE OF CORRECTION

Patent No. 3,628,910                    Dated December 21, 1971

Inventor(s) Martin Grayson

It is certified that error appears in the above-identified patent and that said Letters Patent are hereby corrected as shown below:

Column 2, line 9, after the word "comprising" delete the words "in a concentration of".
Column 2, line 10, after the word "comprises" insert --in a concentration of--.

Column 3, line 45, delete "Butylbis(hydrta".
Column 4, line 52, "diethy (2" should read --diethyl (2--.

Signed and sealed this 6th day of June 1972.

(SEAL)
Attest:

EDWARD M. FLETCHER, JR.            ROBERT GOTTSCHALK
Attesting Officer                  Commissioner of Patents